(12) United States Patent
Widdowson et al.

(10) Patent No.: US 7,387,392 B2
(45) Date of Patent: Jun. 17, 2008

(54) SYSTEM AND METHOD FOR PROJECTING SUB-FRAMES ONTO A SURFACE

(76) Inventors: Simon Widdowson, 1501 Page Mill Rd., Palo Alto, CA (US) 94304-1126; Niranjan Damera-Venkata, 1501 Page Mill Rd., Palo Alto, CA (US) 94304-1126; Nelson Liang An Chang, 1501 Page Mill Rd., Palo Alto, CA (US) 94304-1126

( * ) Notice: Subject to any disclaimer, the term of this patent is extended or adjusted under 35 U.S.C. 154(b) by 459 days.

(21) Appl. No.: 11/220,092

(22) Filed: Sep. 6, 2005

(65) Prior Publication Data

US 2007/0052934 A1    Mar. 8, 2007

(51) Int. Cl.
    *G03B 21/14*    (2006.01)
(52) U.S. Cl. .................... 353/94; 353/121; 353/31; 348/839; 345/9
(58) Field of Classification Search ................. 353/30, 353/31, 94, 85; 348/839, 840; 345/1.3, 345/3.4, 9
See application file for complete search history.

(56) References Cited

U.S. PATENT DOCUMENTS

| | | |
|---|---|---|
| 3,589,806 A | 6/1971 | Rak |
| 4,373,784 A | 2/1983 | Nonomura et al. |
| 4,662,746 A | 5/1987 | Hornbeck |
| 4,811,003 A | 3/1989 | Strathman et al. |
| 4,956,619 A | 9/1990 | Hornbeck |
| 5,061,049 A | 10/1991 | Hornbeck |
| 5,083,857 A | 1/1992 | Hornbeck |
| 5,146,356 A | 9/1992 | Carlson |
| 5,309,241 A | 5/1994 | Hoagland |
| 5,317,409 A | 5/1994 | Macocs |
| 5,386,253 A | 1/1995 | Fielding |
| 5,402,184 A | 3/1995 | O'Grady et al. |
| 5,490,009 A | 2/1996 | Venkateswar et al. |
| 5,557,353 A | 9/1996 | Stahl |
| 5,689,283 A | 11/1997 | Shirochi |
| 5,751,379 A | 5/1998 | Markandey et al. |
| 5,842,762 A | 12/1998 | Clarke |
| 5,897,191 A | 4/1999 | Clarke |
| 5,912,773 A | 6/1999 | Barnett et al. |
| 5,920,365 A | 7/1999 | Eriksson |
| 5,978,518 A | 11/1999 | Oliyide et al. |
| 6,025,951 A | 2/2000 | Swart et al. |
| 6,067,143 A | 5/2000 | Tomita |

(Continued)

FOREIGN PATENT DOCUMENTS

EP    1 001 306 A2    5/2000

OTHER PUBLICATIONS

C. Jaynes et al., "Super-Resolution Composition in Multi-Projector Displays," IEEE Int'l Workshop on Projector-Camera Systems, Oct. 2003; 8 pgs.

(Continued)

*Primary Examiner*—William C. Dowling

(57) ABSTRACT

A display system includes a housing including a plurality of bays. The system includes a plurality of removable projector modules configured to project images onto a surface. Each projector module is configured to be inserted into and removed from one of the bays. The system includes a controller coupled to the bays for sensing when projector modules are inserted into or removed from the bays.

29 Claims, 6 Drawing Sheets

U.S. PATENT DOCUMENTS

| | | | |
|---|---|---|---|
| 6,104,375 | A | 8/2000 | Lam |
| 6,118,584 | A | 9/2000 | Van Berkel et al. |
| 6,141,039 | A | 10/2000 | Poetsch |
| 6,184,969 | B1 | 2/2001 | Fergason |
| 6,219,017 | B1 | 4/2001 | Shimada et al. |
| 6,239,783 | B1 | 5/2001 | Hill et al. |
| 6,243,055 | B1 | 6/2001 | Fergason |
| 6,313,888 | B1 | 11/2001 | Tabata |
| 6,317,171 | B1 | 11/2001 | Dewald |
| 6,384,816 | B1 | 5/2002 | Tabata |
| 6,390,050 | B2 | 5/2002 | Feikus |
| 6,392,612 | B1 * | 5/2002 | George .................. 345/20 |
| 6,393,145 | B2 | 5/2002 | Betrisey et al. |
| 6,522,356 | B1 | 2/2003 | Watanabe |
| 6,657,603 | B1 | 12/2003 | Demetrescu et al. |
| 6,758,579 | B2 * | 7/2004 | Ishikawa et al. ............ 362/238 |
| 6,829,664 | B2 | 12/2004 | Nomizo et al. |
| 6,932,481 | B2 | 8/2005 | Koyama et al. |
| 6,988,803 | B2 * | 1/2006 | Maximus .................. 353/20 |
| 7,201,493 | B2 * | 4/2007 | Martynov et al. .......... 362/231 |
| 2002/0054274 | A1 * | 5/2002 | Bloechel .................. 353/30 |
| 2003/0020809 | A1 | 1/2003 | Gibbon et al. |
| 2003/0076325 | A1 | 4/2003 | Thrasher |
| 2003/0090597 | A1 | 5/2003 | Katoh et al. |
| 2004/0239885 | A1 | 12/2004 | Jaynes et al. |
| 2006/0221304 | A1 * | 10/2006 | Damera-Venkata et al. ... 353/30 |
| 2007/0097017 | A1 * | 5/2007 | Widdowson et al. ........ 345/1.3 |
| 2007/0097334 | A1 * | 5/2007 | Damera-Venkata et al. ... 353/94 |
| 2007/0132965 | A1 * | 6/2007 | Damera-Venkata et al. ... 353/94 |
| 2007/0132966 | A1 * | 6/2007 | Widdowson et al. ........ 353/121 |
| 2007/0132967 | A1 * | 6/2007 | Damera-Venkata et al. . 353/121 |
| 2008/0002160 | A1 * | 1/2008 | Chang et al. .................. 353/94 |
| 2008/0043209 | A1 * | 2/2008 | Widdowson et al. ......... 353/94 |

OTHER PUBLICATIONS

L.M. Chen & S. Hasagawa, "Visual Resolution Limits for Color Matrix Displays—One Panel Projectors," vol. 13, pp. 221-226; 1992.

A. Yasuda et al., "FLC Wobbling for High-Resolution Projectors," Journal of the SID, pp. 229-305; May 1997.

T. Tokita et al., "P-108: FLC Resolution Enhancing Device for Projection Displays," pp. 229-305; SID 02 Digest 2002.

D.K. Kelley, "Motion and Vision—II. Stabilized Spatio-Temporal Threshold Surface," Journal of the Optical Society of America, vol. 69, No. 10; Oct. 1979.

Candice H. Brown Elliott et al., "Color Subpixel REndering Projectors and Flat Panel Displays," SMPTE Advanced Motion Imaging Conference; pp. 1-4; Feb. 27-Mar. 1, 2003.

Diana C. Chen, "Display Resolution Enhancement with Optical Scanners," Applied Optics, vol. 40, No. 5, pp. 636-643; Feb. 10, 2001.

E. Stupp et al., "Projection Displays," SID Series in Display Technology, Wiley; 1999.

* cited by examiner

SYSTEM AND METHOD FOR PROJECTING SUB-FRAMES ONTO A SURFACE

CROSS-REFERENCE TO RELATED APPLICATION

This application is related to U.S. patent application Ser. No. 11/080,223, filed Mar. 15, 2005, and entitled PROJECTION OF OVERLAPPING SINGLE COLOR SUB-FRAMES ONTO A SURFACE and U.S. patent application Ser. No. 11/080,583, filed Mar. 15, 2005, and entitled PROJECTION OF OVERLAPPING SUB-FRAMES ONTO A SURFACE, both of which are hereby incorporated by reference herein.

BACKGROUND

Two types of projection display systems are digital light processor (DLP) systems, and liquid crystal display (LCD) systems. It is desirable in some projection applications to provide a high lumen level output, but it is very costly to provide such output levels in existing DLP and LCD projection systems. Three choices exist for applications where high lumen levels are desired: (1) high-output projectors; (2) tiled, low-output projectors; and (3) superimposed, low-output projectors.

When information requirements are modest, a single high-output projector is typically employed. This approach dominates digital cinema today, and the images typically have a nice appearance. High-output projectors have the lowest lumen value (i.e., lumens per dollar). The lumen value of high output projectors is less than half of that found in low-end projectors. If the high output projector fails, the screen goes black. Also, parts and service are available for high output projectors only via a specialized niche market.

Tiled projection can deliver very high resolution, but it is difficult to hide the seams separating tiles, and output is often reduced to produce uniform tiles. Tiled projection can deliver the most pixels of information. For applications where large pixel counts are desired, such as command and control, tiled projection is a common choice. Registration, color, and brightness must be carefully controlled in tiled projection. Matching color and brightness is accomplished by attenuating output, which costs lumens. If a single projector fails in a tiled projection system, the composite image is ruined.

Superimposed projection provides excellent fault tolerance and full brightness utilization, but resolution is typically compromised. Algorithms that seek to enhance resolution by offsetting multiple projection elements have been previously proposed. These methods assume simple shift offsets between projectors, use frequency domain analyses, and rely on heuristic methods to compute component sub-frames. The proposed systems do not generate optimal sub-frames in real-time, and do not take into account arbitrary relative geometric distortion between the component projectors, and do not project single-color sub-frames.

Existing projection systems do not provide a cost effective solution for high lumen level (e.g., greater than about 10,000 lumens) applications.

In addition, in the field of use of digital cinema, current projection vendors are attempting to sell very highly priced projection systems with an uncertain technical future to theaters that typically can neither afford the investment nor afford the technical risk. From the point of view of exhibitors (theater owners), digital cinema is a very expensive investment with a high degree of uncertainty. The cost of dedicated projection equipment and infrastructure is very high. New revenue streams from showing alternative digital content such as advertising and event display are in the early stages of evolution. Even if a theater did pay for the up-front equipment cost, the large payback duration puts the theater at risk of technology obsolescence for example, from new projection technologies around the corner, such as laser projection. Further, existing systems are not configured to allow exhibitors to allocate and reconfigure projection resources dynamically.

SUMMARY

One form of the present invention provides a display system. The display system includes a housing including a plurality of bays. The system includes a plurality of removable projector modules configured to project images onto a surface. Each projector module is configured to be inserted into and removed from one of the bays. The system includes a controller coupled to the bays for sensing when projector modules are inserted into or removed from the bays.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
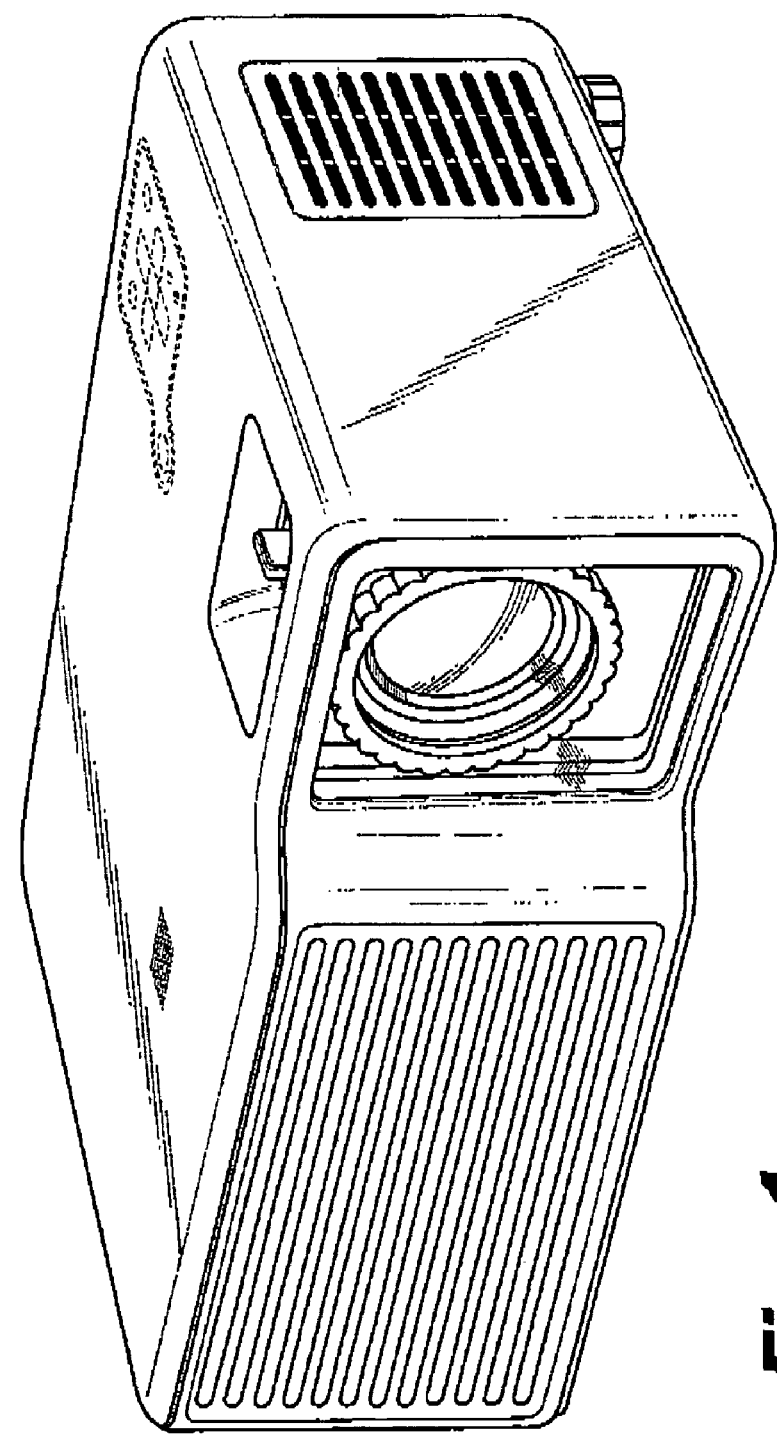
FIG. 1 is a block diagram illustrating an image display system according to one embodiment of the present invention.

FIG. 1 is a block diagram illustrating an image display system 100 according to one embodiment of the present invention. Image display system 100 processes image data 102 and generates a corresponding displayed image 114. Displayed image 114 is defined to include any pictorial, graphical, or textural characters, symbols, illustrations, or other representations of information.

In one embodiment, image display system 100 includes controller 101, projectors 112A-112C (collectively referred to as projectors 112), and camera 122. Controller 101 is communicatively coupled to projectors 112 and camera 122 via communication links 109. Controller 101 includes image frame buffer 104, sub-frame generator 108, and calibration unit 124. Image frame buffer 104 receives and buffers image data 102 to create image frames 106. Sub-frame generator 108 processes image frames 106 to define corresponding image sub-frames 110A-110C (collectively referred to as sub-frames 110). In one embodiment, for each image frame 106, sub-frame generator 108 generates one sub-frame 110A for projector 112A, one sub-frame 110B for projector 112B, and one sub-frame 110C for projector 112C. The sub-frames 110A-110C are received by projectors 112A-112C, respectively, and stored in image frame buffers 113A-113C (collectively referred to as image frame buffers 113), respectively. Projectors 112A-112C project the sub-frames 110A-110C, respectively, onto target surface 116 to produce displayed image 114 for viewing by a user.

Image frame buffer 104 includes memory for storing image data 102 for one or more image frames 106. Thus, image frame buffer 104 constitutes a database of one or more image frames 106. Image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

Sub-frame generator 108 receives and processes image frames 106 to define a plurality of image sub-frames 110. Sub-frame generator 108 generates sub-frames 110 based on image data in image frames 106. In one embodiment, sub-frame generator 108 generates image sub-frames 110 with a resolution that matches the resolution of projectors 112, which is less than the resolution of image frames 106 in one embodiment. Sub-frames 110 each include a plurality of columns and a plurality of rows of individual pixels representing a subset of an image frame 106.

In one embodiment, sub-frames 110 are each single-color sub-frames. In one form of the invention, sub-frames 110A are red sub-frames, sub-frames 110B are green sub-frames, and sub-frames 110C are blue sub-frames. In other embodiments, different colors may be used, and additional projectors 112 may be used to provide additional colors, including a system that combines the projection of both single color sub-frames and multiple color sub-frames. In one form of the invention embodiment, each projector 112 projects single-color sub-frames 110 that are different in color than the color of the sub-frames 110 projected by the other projectors 112. In one embodiment, each projector 112 includes a color filter to generate the single color for each sub-frame 110 projected by that projector 112.

Projectors 112 receive image sub-frames 110 from sub-frame generator 108 and, in one embodiment, simultaneously project the image sub-frames 110 onto target 116 at overlapping and spatially offset positions to produce displayed image 114. In one embodiment, display system 100 is configured to give the appearance to the human eye of high-resolution displayed images 114 by displaying overlapping and spatially shifted lower-resolution sub-frames 110 from multiple projectors 112. In one form of the invention, the projection of overlapping and spatially shifted sub-frames 110 gives the appearance of enhanced resolution (i.e., higher resolution than the sub-frames 110 themselves).

Figure 2A:
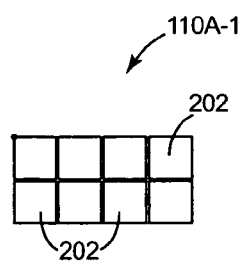
FIGS. 2A-2C are schematic diagrams illustrating the projection of two sub-frames according to one embodiment of the present invention.
Figure 2B:
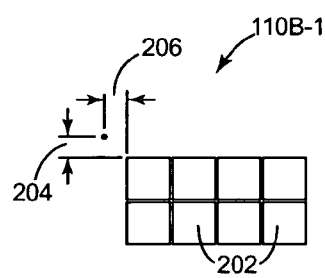
Figure 2C:
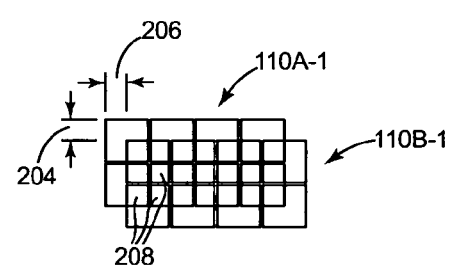

It will be understood by persons of ordinary skill in the art that the sub-frames 110 projected onto target 116 may have perspective distortions, and the pixels may not appear as perfect squares with no variation in the offsets and overlaps from pixel to pixel, such as that shown in FIGS. 2A-2C. Rather, in one form of the invention, the pixels of sub-frames 110 take the form of distorted quadrilaterals or some other shape, and the overlaps may vary as a function of position. Thus, terms such as "spatially shifted" and "spatially offset positions" as used herein are not limited to a particular pixel shape or fixed offsets and overlaps from pixel to pixel, but rather are intended to include any arbitrary pixel shape, and offsets and overlaps that may vary from pixel to pixel.

A problem of sub-frame generation, which is addressed by embodiments of the present invention, is to determine appropriate values for the sub-frames 110 so that the displayed image 114 produced by the projected sub-frames 110 is close in appearance to how the high-resolution image (e.g., image frame 106) from which the sub-frames 110 were derived would appear if displayed directly. Naive overlapped projection of different colored sub-frames 110 by different projectors 112 can lead to significant color artifacts at the edges due to misregistration among the colors. A problem solved by one embodiment of the invention is to determine the single-color sub-frames 110 to be projected by each projector 112 so that the visibility of color artifacts is minimized.

It will be understood by a person of ordinary skill in the art that functions performed by sub-frame generator 108 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

Also shown in FIG. 1 is reference projector 118 with an image frame buffer 120. Reference projector 118 is shown with hidden lines in FIG. 1 because, in one embodiment, projector 118 is not an actual projector, but rather is a hypothetical high-resolution reference projector that is used in an image formation model for generating optimal sub-frames 110, as described in further detail below with reference to FIGS. 2A-2C and 3. In one embodiment, the location of one of the actual projectors 112 is defined to be the location of the reference projector 118.

In one embodiment, display system 100 includes a camera 122 and a calibration unit 124, which are used in one form of the invention to automatically determine a geometric mapping between each projector 112 and the reference projector 118, as described in further detail below with reference to FIGS. 2A-2C and 3. In another embodiment, display system 100 includes two or more cameras 122.

In the embodiment shown in FIG. 1, the controller 101 or backend portion of the system, including any system management such as shared memory control or graphics pipeline reconfiguration, are separated from the projectors 112 and camera 122. In one form of the invention, the controller 101 is dynamically reconfigurable such that it can automatically compensate for the removal or addition of projectors 112 or cameras 122, as described in further detail below with reference to FIGS. 5 and 6.

In one form of the invention, image display system 100 includes hardware, software, firmware, or a combination of these. In one embodiment, one or more components of image display system 100 are included in a computer, computer server, or other microprocessor-based system capable of performing a sequence of logic operations. In addition, processing can be distributed throughout the system with individual portions being implemented in separate system components, such as in a networked or multiple computing unit environment.

In one embodiment, display system 100 uses two projectors 112. FIGS. 2A-2C are schematic diagrams illustrating the projection of two sub-frames 110 according to one embodiment of the present invention. As illustrated in FIGS. 2A and 2B, sub-frame generator 108 defines two image sub-frames 110 for each of the image frames 106. More specifically, sub-frame generator 108 defines a first sub-frame 110A-1 and a second sub-frame 110B-1 for an image frame 106. As such, first sub-frame 110A-1 and second sub-frame 110B-1 each include a plurality of columns and a plurality of rows of individual pixels 202 of image data.

In one embodiment, as illustrated in FIG. 2B, when projected onto target 116, second sub-frame 110B-1 is offset from first sub-frame 110A-1 by a vertical distance 204 and a horizontal distance 206. As such, second sub-frame 110B-1 is spatially offset from first sub-frame 110A-1 by a predetermined distance. In one illustrative embodiment, vertical distance 204 and horizontal distance 206 are each approximately one-half of one pixel.

As illustrated in FIG. 2C, a first one of the projectors 112A projects first sub-frame 110A-1 in a first position and a second one of the projectors 112B simultaneously projects second sub-frame 110B-1 in a second position, spatially offset from the first position. More specifically, the display of second sub-frame 110B-1 is spatially shifted relative to the display of first sub-frame 110A-1 by vertical distance 204 and horizontal distance 206. As such, pixels of first sub-frame 110A-1 overlap pixels of second sub-frame 110B-1, thereby producing the appearance of higher resolution pixels 208. The overlapped sub-frames 110A-1 and 110B-1 also produce a brighter overall image 114 than either of the sub-frames 110 alone. In other embodiments, more than two projectors 112 are used in system 100, and more than two sub-frames 110 are defined for each image frame 106, which results in a further increase in the resolution, brightness, and color of the displayed image 114.

In one form of the invention, sub-frames 110 have a lower resolution than image frames 106. Thus, sub-frames 110 are also referred to herein as low-resolution images or sub-frames 110, and image frames 106 are also referred to herein as high-resolution images or frames 106. It will be understood by persons of ordinary skill in the art that the terms low resolution and high resolution are used herein in a comparative fashion, and are not limited to any particular minimum or maximum number of pixels.

In one form of the invention, display system 100 produces a superimposed projected output that takes advantage of natural pixel misregistration to provide a displayed image 114 with a higher resolution than the individual sub-frames 110. In one embodiment, image formation due to multiple overlapped projectors 112 is modeled using a signal processing model. Optimal sub-frames 110 for each of the component projectors 112 are estimated by sub-frame generator 108 based on the model, such that the resulting image predicted by the signal processing model is as close as possible to the desired high-resolution image to be projected. In one embodiment, the signal processing model is used to derive values for the sub-frames 110 that minimize visual color artifacts that can occur due to offset projection of single-color sub-frames 110.

In one embodiment, sub-frame generator 108 is configured to generate sub-frames 110 based on the maximization of a probability that, given a desired high resolution image, a simulated high-resolution image that is a function of the sub-frame values, is the same as the given, desired high-resolution image. If the generated sub-frames 110 are optimal, the simulated high-resolution image will be as close as possible to the desired high-resolution image.

One form of the present invention determines and generates single-color sub-frames 110 for each projector 112 that minimize color aliasing due to offset projection. This process may be thought of as inverse de-mosaicking. A de-mosaicking process seeks to synthesize a high-resolution, full color image free of color aliasing given color samples taken at relative offsets. One form of the present invention essentially performs the inverse of this process and determines the colorant values to be projected at relative offsets, given a full color high-resolution image 106. The generation of optimal sub-frames 110 based on a simulated high-resolution image and a desired high-resolution image is described in further detail below with reference to FIG. 3.

Figure 3:
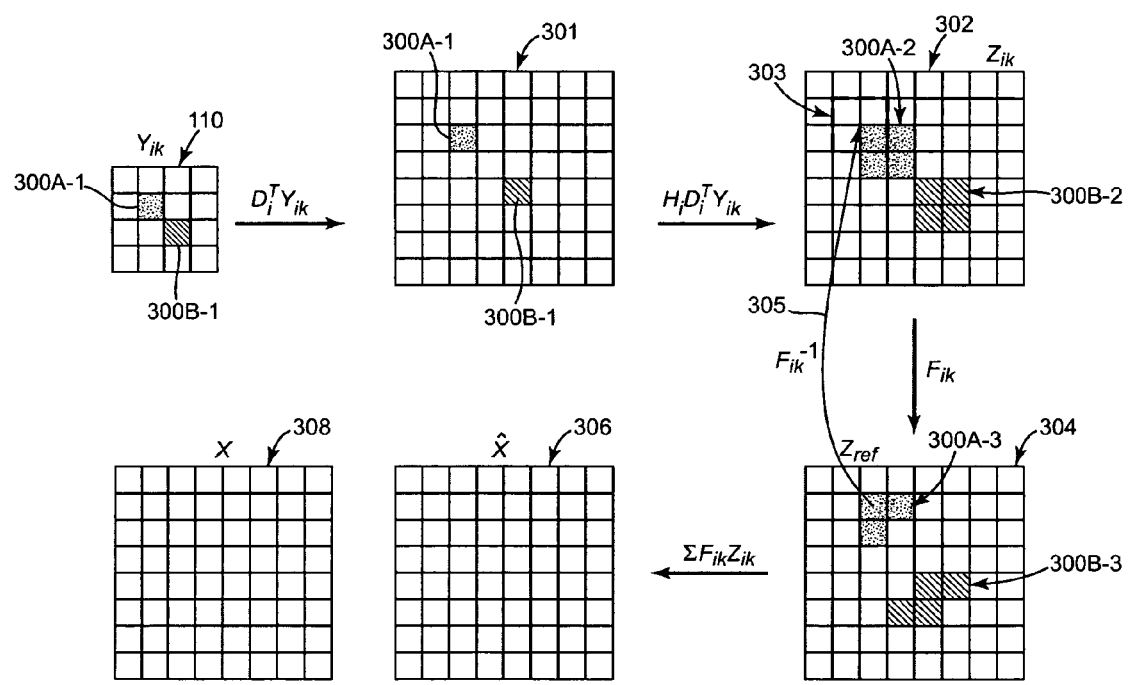
FIG. 3 is a diagram illustrating a model of an image formation process according to one embodiment of the present invention.

FIG. 3 is a diagram illustrating a model of an image formation process according to one embodiment of the present invention. The sub-frames 110 are represented in the model by $Y_{ik}$, where "k" is an index for identifying individual sub-frames 110, and "i" is an index for identifying color planes. Two of the sixteen pixels of the sub-frame 110 shown in FIG. 3 are highlighted, and identified by reference numbers 300A-1 and 300B-1. The sub-frames 110 ($Y_{ik}$) are represented on a hypothetical high-resolution grid by up-sampling (represented by $D_i^T$) to create up-sampled image 301. The up-sampled image 301 is filtered with an interpolating filter (represented by $H_i$) to create a high-resolution image 302 ($Z_{ik}$) with "chunky pixels". This relationship is expressed in the following Equation I:

$$Z_{ik} = H_i D_i^T Y_{ik} \qquad \text{Equation I}$$

where:
  k=index for identifying individual sub-frames 110;
  i=index for identifying color planes;
  $Z_{ik}$=kth low-resolution sub-frame 110 in the ith color plane on a hypothetical high-resolution grid;
  $H_i$=Interpolating filter for low-resolution sub-frames 110 in the ith color plane;
  $D_i^T$=up-sampling matrix for sub-frames 110 in the ith color plane; and
  $Y_{ik}$=kth low-resolution sub-frame 110 in the ith color plane.

The low-resolution sub-frame pixel data ($Y_{ik}$) is expanded with the up-sampling matrix ($D_i^T$) so that the sub-frames 110 ($Y_{ik}$) can be represented on a high-resolution grid. The interpolating filter ($H_i$) fills in the missing pixel data produced by up-sampling. In the embodiment shown in FIG. 3, pixel 300A-1 from the original sub-frame 110 ($Y_{ik}$) corresponds to four pixels 300A-2 in the high-resolution image 302 ($Z_{ik}$), and pixel 300B-1 from the original sub-frame 110 ($Y_{ik}$) corresponds to four pixels 300B-2 in the high-resolution image 302 ($Z_{ik}$). The resulting image 302 ($Z_{ik}$) in Equation I models the output of the projectors 112 if there was no relative distortion or noise in the projection process. Relative geometric distortion between the projected component sub-frames 110 results due to the different optical paths and locations of the component projectors 112. A geometric transformation is modeled with the operator, $F_{ik}$, which maps coordinates in the frame buffer 113 of a projector 112 to the frame buffer 120 of the reference projector 118 (FIG. 1) with sub-pixel accuracy, to generate a warped image 304 ($Z_{ref}$). In one embodiment, $F_{ik}$ is linear with respect to pixel intensities, but is non-linear with respect to the coordinate transformations. As shown in FIG. 3, the four pixels 300A-2 in image 302 are mapped to the three pixels 300A-3 in image 304, and the four pixels 300B-2 in image 302 are mapped to the four pixels 300B-3 in image 304.

In one embodiment, the geometric mapping ($F_{ik}$) is a floating-point mapping, but the destinations in the mapping are on an integer grid in image 304. Thus, it is possible for multiple pixels in image 302 to be mapped to the same pixel location in image 304, resulting in missing pixels in image 304. To avoid this situation, in one form of the present invention, during the forward mapping ($F_{ik}$), the inverse mapping ($F_{ik}^{-1}$) is also utilized as indicated at 305 in FIG. 3. Each destination pixel in image 304 is back projected (i.e., $F_{ik}^{-1}$) to find the corresponding location in image 302. For the embodiment shown in FIG. 3, the location in image 302 corresponding to the upper-left pixel of the pixels 300A-3 in image 304 is the location at the upper-left corner of the group of pixels 300A-2. In one form of the invention, the values for the pixels neighboring the identified location in image 302 are combined (e.g., averaged) to form the value for the corresponding pixel in image 304. Thus, for the example shown in FIG. 3, the value for the upper-left pixel in the group of pixels 300A-3 in image 304 is determined by averaging the values for the four pixels within the frame 303 in image 302.

In another embodiment of the invention, the forward geometric mapping or warp ($F_k$) is implemented directly, and the inverse mapping ($F_k^{-1}$) is not used. In one form of this embodiment, a scatter operation is performed to eliminate missing pixels. That is, when a pixel in image 302 is mapped to a floating point location in image 304, some of the image data for the pixel is essentially scattered to multiple pixels neighboring the floating point location in image 304. Thus, each pixel in image 304 may receive contributions from multiple pixels in image 302, and each pixel in image 304 is normalized based on the number of contributions it receives.

A superposition/summation of such warped images 304 from all of the component projectors 112 in a given color plane forms a hypothetical or simulated high-resolution image (X-hat$_i$) for that color plane in the reference projector frame buffer 120, as represented in the following Equation II:

$$\hat{X}_i = \sum_k F_{ik} Z_{ik} \qquad \text{Equation II}$$

where:
- k=index for identifying individual sub-frames 110;
- i=index for identifying color planes;
- X-hat$_i$=hypothetical or simulated high-resolution image for the ith color plane in the reference projector frame buffer 120;
- $F_{ik}$=operator that maps the kth low-resolution sub-frame 110 in the ith color plane on a hypothetical high-resolution grid to the reference projector frame buffer 120; and
- $Z_{ik}$=kth low-resolution sub-frame 110 in the ith color plane on a hypothetical high-resolution grid, as defined in Equation I.

A hypothetical or simulated image 306 (X-hat) is represented by the following Equation III:

$$\hat{X} = [\hat{X}_1 \hat{X}_2 \ldots \hat{X}_N]^T \qquad \text{Equation III}$$

where:
- X-hat=hypothetical or simulated high-resolution image in the reference projector frame buffer 120;
- X-hat$_1$=hypothetical or simulated high-resolution image for the first color plane in the reference projector frame buffer 120, as defined in Equation II;
- X-hat$_2$=hypothetical or simulated high-resolution image for the second color plane in the reference projector frame buffer 120, as defined in Equation II;
- X-hat$_N$=hypothetical or simulated high-resolution image for the Nth color plane in the reference projector frame buffer 120, as defined in Equation II; and
- N=number of color planes.

If the simulated high-resolution image 306 (X-hat) in the reference projector frame buffer 120 is identical to a given (desired) high-resolution image 308 (X), the system of component low-resolution projectors 112 would be equivalent to a hypothetical high-resolution projector placed at the same location as the reference projector 118 and sharing its optical path. In one embodiment, the desired high-resolution images 308 are the high-resolution image frames 106 (FIG. 1) received by sub-frame generator 108.

In one embodiment, the deviation of the simulated high-resolution image 306 (X-hat) from the desired high-resolution image 308 (X) is modeled as shown in the following Equation IV:

$$X = \hat{X} + \eta \qquad \text{Equation IV}$$

where:
- X=desired high-resolution frame 308;
- X-hat=hypothetical or simulated high-resolution frame 306 in the reference projector frame buffer 120; and
- η=error or noise term.

As shown in Equation IV, the desired high-resolution image 308 (X) is defined as the simulated high-resolution image 306 (X-hat) plus η, which in one embodiment represents zero mean white Gaussian noise.

The solution for the optimal sub-frame data ($Y_{ik}^*$) for the sub-frames 110 is formulated as the optimization given in the following Equation V:

$$Y_{ik}^* = \underset{Y_{ik}}{\mathrm{argmax}} P(\hat{X}|X) \qquad \text{Equation V}$$

where:
- k=index for identifying individual sub-frames 110;
- i=index for identifying color planes;
- $Y_{ik}^*$=optimum low-resolution sub-frame data for the kth sub-frame 110 in the ith color plane;
- $Y_{ik}$=kth low-resolution sub-frame 110 in the ith color plane;
- X-hat=hypothetical or simulated high-resolution frame 306 in the reference projector frame buffer 120, as defined in Equation III;
- X=desired high-resolution frame 308; and
- P(X-hat|X)=probability of X-hat given X.

Thus, as indicated by Equation V, the goal of the optimization is to determine the sub-frame values ($Y_{ik}$) that maximize the probability of X-hat given X. Given a desired high-resolution image 308 (X) to be projected, sub-frame generator 108 (FIG. 1) determines the component subframes 110 that maximize the probability that the simulated high-resolution image 306 (X-hat) is the same as or matches the "true" high-resolution image 308 (X).

Using Bayes rule, the probability P(X-hat|X) in Equation V can be written as shown in the following Equation VI:

$$P(\hat{X}|X) = \frac{P(X|\hat{X})P(\hat{X})}{P(X)} \qquad \text{Equation VI}$$

where:
- X-hat=hypothetical or simulated high-resolution frame 306 in the reference projector frame buffer 120, as defined in Equation III;
- X=desired high-resolution frame 308;
- P(X-hat|X)=probability of X-hat given X;
- P(X|X-hat)=probability of X given X-hat;
- P(X-hat)=prior probability of X-hat; and
- P(X)=prior probability of X.

The term P(X) in Equation VI is a known constant. If X-hat is given, then, referring to Equation IV, X depends only on the noise term, η, which is Gaussian. Thus, the term P(X|X-hat) in Equation VI will have a Gaussian form as shown in the following Equation VII:

$$P(X|\hat{X}) = \frac{1}{C} e^{-\sum_i \frac{(\|X_i - \hat{X}_i\|^2)}{2\sigma_i^2}} \qquad \text{Equation VII}$$

where:
- X-hat=hypothetical or simulated high-resolution frame 306 in the reference projector frame buffer 120, as defined in Equation III;
- X=desired high-resolution frame 308;
- P(X|X-hat)=probability of X given X-hat;
- C=normalization constant;
- i=index for identifying color planes;
- $X_i$=ith color plane of the desired high-resolution frame 308;
- X-hat$_i$=hypothetical or simulated high-resolution image for the ith color plane in the reference projector frame buffer 120, as defined in Equation II; and
- $\sigma_i$=variance of the noise term, η, for the ith color plane.

To provide a solution that is robust to minor calibration errors and noise, a "smoothness" requirement is imposed on X-hat. In other words, it is assumed that good simulated images 306 have certain properties. For example, for most good color images, the luminance and chrominance derivatives are related by a certain value. In one embodiment, a smoothness requirement is imposed on the luminance and chrominance of the X-hat image based on a "Hel-Or" color prior model, which is a conventional color model known to those of ordinary skill in the art. The smoothness requirement according to one embodiment is expressed in terms of a desired probability distribution for X-hat given by the following Equation VIII:

$$P(\hat{X}) = \frac{1}{Z(\alpha, \beta)} e^{-\{\alpha^2(\|\nabla \hat{C}_1\|^2 + \|\nabla \hat{C}_2\|^2) + \beta^2(\|\nabla \hat{L}\|^2)\}} \qquad \text{Equation VIII}$$

where:
- P(X-hat)=prior probability of X-hat;
- α and β=smoothing constants;
- Z(α, β)=normalization function;
- ∇=gradient operator; and
- C-hat$_1$=first chrominance channel of X-hat;
- C-hat$_2$=second chrominance channel of X-hat; and
- L-hat=luminance of X-hat.

In another embodiment of the invention, the smoothness requirement is based on a prior Laplacian model, and is expressed in terms of a probability distribution for X-hat given by the following Equation IX:

$$P(\hat{X}) = \frac{1}{Z(\alpha, \beta)} e^{-\{\alpha(|\nabla \hat{C}_1| + |\nabla \hat{C}_2|) + \beta(|\nabla \hat{L}|)\}} \qquad \text{Equation IX}$$

where:
- P(X-hat)=prior probability of X-hat;
- α and, β=smoothing constants;
- Z(α, β)=normalization function;
- ∇=gradient operator; and
- C-hat$_1$=first chrominance channel of X-hat;
- C-hat$_2$=second chrominance channel of X-hat; and
- L-hat=luminance of X-hat.

The following discussion assumes that the probability distribution given in Equation VIII, rather than Equation IX, is being used. As will be understood by persons of ordinary skill in the art, a similar procedure would be followed if Equation IX were used. Inserting the probability distributions from Equations VII and VIII into Equation VI, and inserting the result into Equation V, results in a maximization problem involving the product of two probability distributions (note that the probability P(X) is a known constant and goes away in the calculation). By taking the negative logarithm, the exponents go away, the product of the two probability distributions becomes a sum of two probability distributions, and the maximization problem given in Equation V is transformed into a function minimization problem, as shown in the following Equation X:

$$Y_{ik}^* = \underset{Y_{ik}}{\operatorname{argmin}} \sum_{i=1}^{N} \|X_i - \hat{X}_i\|^2 + \\ \alpha^2 \left\{ \left\|\nabla\left(\sum_{i=1}^{N} T_{C_1 i} \hat{X}_i\right)\right\|^2 + \left\|\nabla\left(\sum_{i=1}^{N} T_{C_2 i} \hat{X}_i\right)\right\|^2 \right\} + \\ \beta^2 \left\|\nabla\left(\sum_{i=1}^{N} T_{L i} \hat{X}_i\right)\right\|^2 \qquad \text{Equation X}$$

where:
- k=index for identifying individual sub-frames 110;
- i=index for identifying color planes;
- $Y_{ik}$*=optimum low-resolution sub-frame data for the kth sub-frame 110 in the ith color plane;
- $Y_{ik}$=kth low-resolution sub-frame 110 in the ith color plane;
- N=number of color planes;
- $X_i$=ith color plane of the desired high-resolution frame 308;
- X-hat$_i$=hypothetical or simulated high-resolution image for the ith color plane in the reference projector frame buffer 120, as defined in Equation II;

α and β=smoothing constants;

∇=gradient operator;

$T_{C1i}$=ith element in the second row in a color transformation matrix, T, for transforming the first chrominance channel of X-hat;

$T_{C2i}$=ith element in the third row in a color transformation matrix, T, for transforming the second chrominance channel of X-hat; and $T_{Li}$=ith element in the first row in a color transformation matrix, T, for transforming the luminance of X-hat.

The function minimization problem given in Equation X is solved by substituting the definition of X-hat$_i$ from Equation II into Equation X and taking the derivative with respect to $Y_{ik}$, which results in an iterative algorithm given by the following Equation XI:

$$Y_{ik}^{(n+1)} = Y_{ik}^{(n)} - \Theta \left\{ D_i F_{ik}^T H_i^T \left[ \begin{array}{l} (\hat{X}_i^{(n)} - X_i) + \\ \alpha^2 \nabla^2 \left( \begin{array}{l} T_{C1i} \sum_{j=1}^{N} T_{C1j} \hat{X}_j^{(n)} + \\ T_{C2i} \sum_{j=1}^{N} T_{C2ij} \hat{X}_j^{(n)} \end{array} \right) \\ \beta^2 \nabla^2 T_{Li} \sum_{j=1}^{N} T_{Lj} \hat{X}_j^{(n)} \end{array} \right] ... + \right\}$$

Equation XI where:

k=index for identifying individual sub-frames 110;

i and j=indices for identifying color planes;

n=index for identifying iterations;

$Y_{ik}^{(n+1)}$=kth low-resolution sub-frame 110 in the ith color plane for iteration number n+1;

$Y_{ik}^{(n)}$=kth low-resolution sub-frame 110 in the ith color plane for iteration number n;

Θ=momentum parameter indicating the fraction of error to be incorporated at each iteration;

$D_i$=down-sampling matrix for the ith color plane;

$H_i^T$=Transpose of interpolating filter, $H_i$, from Equation I (in the image domain, $H_i^T$ is a flipped version of $H_i$);

$F_{ik}^T$=Transpose of operator, $F_{ik}$, from Equation II (in the image domain, $F_{ik}^T$ is the inverse of the warp denoted by $F_{ik}$);

X-hat$_i^{(n)}$=hypothetical or simulated high-resolution image for the ith color plane in the reference projector frame buffer 120, as defined in Equation II, for iteration number n;

$X_i$=ith color plane of the desired high-resolution frame 308;

α and β=smoothing constants;

$\nabla^2$=Laplacian operator;

$T_{C1i}$=ith element in the second row in a color transformation matrix, T, for transforming the first chrominance channel of X-hat;

$T_{C2i}$=ith element in the third row in a color transformation matrix, T, for transforming the second chrominance channel of X-hat;

$T_{Li}$=ith element in the first row in a color transformation matrix, T, for transforming the luminance of X-hat;

X-hat$_j^{(n)}$=hypothetical or simulated high-resolution image for the jth color plane in the reference projector frame buffer 120, as defined in Equation II, for iteration number n;

$T_{C1j}$=jth element in the second row in a color transformation matrix, T, for transforming the first chrominance channel of X-hat;

$T_{C2j}$=jth element in the third row in a color transformation matrix, T, for transforming the second chrominance channel of X-hat;

$T_{Lj}$=jth element in the first row in a color transformation matrix, T, for transforming the luminance of X-hat; and N=number of color planes.

Equation XI may be intuitively understood as an iterative process of computing an error in the reference projector 118 coordinate system and projecting it back onto the sub-frame data. In one embodiment, sub-frame generator 108 (FIG. 1) is configured to generate sub-frames 110 in real-time using Equation XI. The generated sub-frames 110 are optimal in one embodiment because they maximize the probability that the simulated high-resolution image 306 (X-hat) is the same as the desired high-resolution image 308 (X), and they minimize the error between the simulated high-resolution image 306 and the desired high-resolution image 308. Equation XI can be implemented very efficiently with conventional image processing operations (e.g., transformations, down-sampling, and filtering). The iterative algorithm given by Equation XI converges rapidly in a few iterations and is very efficient in terms of memory and computation (e.g., a single iteration uses two rows in memory; and multiple iterations may also be rolled into a single step). The iterative algorithm given by Equation XI is suitable for real-time implementation, and may be used to generate optimal sub-frames 110 at video rates, for example.

To begin the iterative algorithm defined in Equation XI, an initial guess, $Y_{ik}^{(0)}$, for the sub-frames 110 is determined. In one embodiment, the initial guess for the sub-frames 110 is determined by texture mapping the desired high-resolution frame 308 onto the sub-frames 110. In one form of the invention, the initial guess is determined from the following Equation XII:

$$Y_{ik}^{(0)} = D_i B_i F_{ik}^T X_i$$

Equation XII where:

k=index for identifying individual sub-frames 110;

i=index for identifying color planes;

$Y_{ik}^{(0)}$=initial guess at the sub-frame data for the kth sub-frame 110 for the ith color plane;

$D_i$=down-sampling matrix for the ith color plane;

$B_i$=interpolation filter for the ith color plane;

$F_{ik}^T$=Transpose of operator, $F_{ik}$, from Equation II (in the image domain, $F_{ik}^T$ is the inverse of the warp denoted by $F_{ik}$); and $X_i$=ith color plane of the desired high-resolution frame 308.

Thus, as indicated by Equation XII, the initial guess ($Y_{ik}^{(0)}$) is determined by performing a geometric transformation ($F_{ik}^T$) on the ith color plane of the desired high-resolution frame 308 ($X_i$), and filtering ($B_i$) and down-sampling ($D_i$) the result. The particular combination of neighboring pixels from the desired high-resolution frame 308 that are used in generating the initial guess ($Y_{ik}^{(0)}$) will depend on the selected filter kernel for the interpolation filter ($B_i$).

In another form of the invention, the initial guess, $Y_{ik}^{(0)}$, for the sub-frames 110 is determined from the following Equation XIII:

$$Y_{ik}^{(0)} = D_i F_{ik}^T X_i \qquad \text{Equation XIII}$$

where:
- k=index for identifying individual sub-frames 110;
- i=index for identifying color planes;
- $Y_{ik}^{(0)}$=initial guess at the sub-frame data for the kth sub-frame 110 for the ith color plane;
- $D_i$=down-sampling matrix for the ith color plane;
- $F_{ik}^T$=Transpose of operator, $F_{ik}$, from Equation II (in the image domain, $F_{ik}^T$ is the inverse of the warp denoted by $F_{ik}$); and
- $X_i$=ith color plane of the desired high-resolution frame 308.

Equation XIII is the same as Equation XII, except that the interpolation filter ($B_k$) is not used.

Several techniques are available to determine the geometric mapping ($F_{ik}$) between each projector 112 and the reference projector 118, including manually establishing the mappings, or using camera 122 and calibration unit 124 (FIG. 1) to automatically determine the mappings. Techniques for determining geometric mappings that are suitable for use in one form of the present invention are described in U.S. patent application Ser. No. 10/356,858, filed Feb. 3, 2003, entitled "MULTIFRAME CORRESPONDENCE ESTIMATION", and U.S. patent application Ser. No. 11/068,195, filed Feb. 28, 2005, entitled "MULTI-PROJECTOR GEOMETRIC CALIBRATION", both of which are hereby incorporated by reference herein.

In one embodiment, if camera 122 and calibration unit 124 are used, the geometric mappings between each projector 112 and the camera 122 are determined by calibration unit 124. These projector-to-camera mappings may be denoted by $T_k$, where k is an index for identifying projectors 112. Based on the projector-to-camera mappings ($T_k$), the geometric mappings ($F_k$) between each projector 112 and the reference projector 118 are determined by calibration unit 124, and provided to sub-frame generator 108. For example, in a display system 100 with two projectors 112A and 112B, assuming the first projector 112A is the reference projector 118, the geometric mapping of the second projector 112B to the first (reference) projector 112A can be determined as shown in the following Equation XIV:

$$F_2 = T_2 T_1^{-1} \qquad \text{Equation XIV}$$

where:
- $F_2$=operator that maps a low-resolution sub-frame 110 of the second projector 112B to the first (reference) projector 112A;
- $T_1$=geometric mapping between the first projector 112A and the camera 122; and
- $T_2$=geometric mapping between the second projector 112B and the camera 122.

In one embodiment, the geometric mappings ($F_{ik}$) are determined once by calibration unit 124, and provided to sub-frame generator 108. In another embodiment, calibration unit 124 continually determines (e.g., once per frame 106) the geometric mappings ($F_{ik}$), and continually provides updated values for the mappings to sub-frame generator 108.

Figure 4:
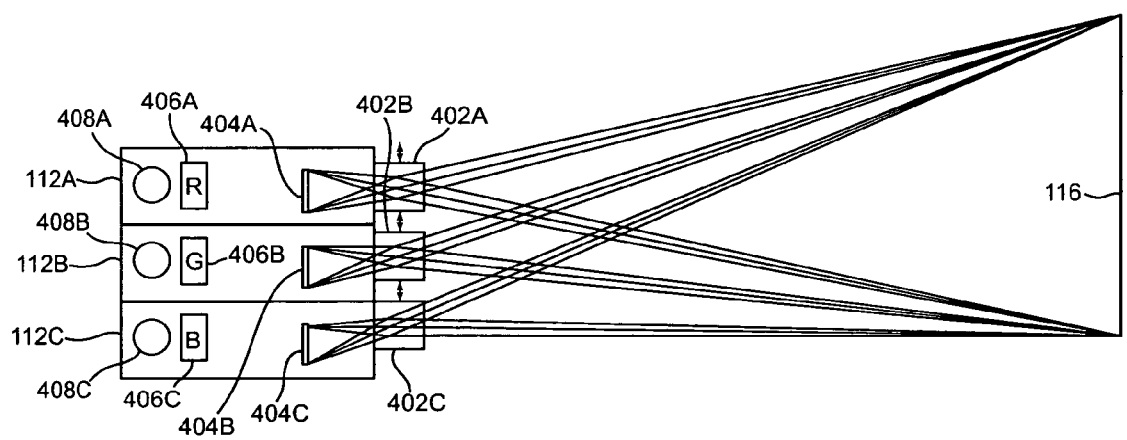
FIG. 4 is a diagram illustrating a projector configuration and a method for adjusting the position of displayed sub-frames on the target surface according to one embodiment of the present invention.

FIG. 4 is a diagram illustrating a projector configuration and a method for adjusting the position of displayed sub-frames 110 on target surface 116 according to one embodiment of the present invention. In the embodiment illustrated in FIG. 4, projectors 112A-112C are stacked on top of each other, and project red, green, and blue sub-frames 110, respectively, onto target surface 116. Projector 112A includes projection lens 402A, light valves 404A, light filter 406A, and light source 408A. Projector 112B includes projection lens 402B, light valves 404B, light filter 406B, and light source 408B. Projector 112C includes projection lens 402C, light valves 404C, light filter 406C, and light source 408C. Light filters 406A-406C (collectively referred to as light filters 406) filter the light output by light sources 408A-408C (collectively referred to as light sources 408), respectively. The filtered light is provided to light valves 404A-404C, which direct the light to projection lenses 402A-402C, respectively. Projection lenses 402A-402C project the received light onto target surface 116. The light from each of the projectors 112 follows a different light path to the target surface 116.

In one embodiment, the position of displayed sub-frames 110 on target surface 116 for each projector 112A-112C is adjusted to a desired position by adjusting the transverse position of the projection lenses 402A-402C of the projectors 112A-112C relative to the light valves 404A-404C of the projectors 112A-112C (as indicated by the arrows in FIG. 4), which causes a translation of the sub-frames 110 on the target surface 116. In one form of the invention, the light source optics (not shown) of projectors 112 are also adjusted to maintain uniform screen illumination.

In one form of the present invention, each projector 112A-112C is configured to project a single color of light. In contrast, conventional projectors typically use a single light source and red, green, and blue light filters to produce multi-color images. In some conventional projectors, the red, green, and blue light filters are positioned on a color wheel. The color wheel is rotated to sequentially produce red, green, and blue (RGB) light. The red, green, and blue light is temporally multiplexed, so only one color is projected at a time. This temporal multiplexing can cause sequential color artifacts. In addition, a blanking period is typically provided between colors so that one color does not blend into the next, and light is wasted during these periods.

Figure 5:
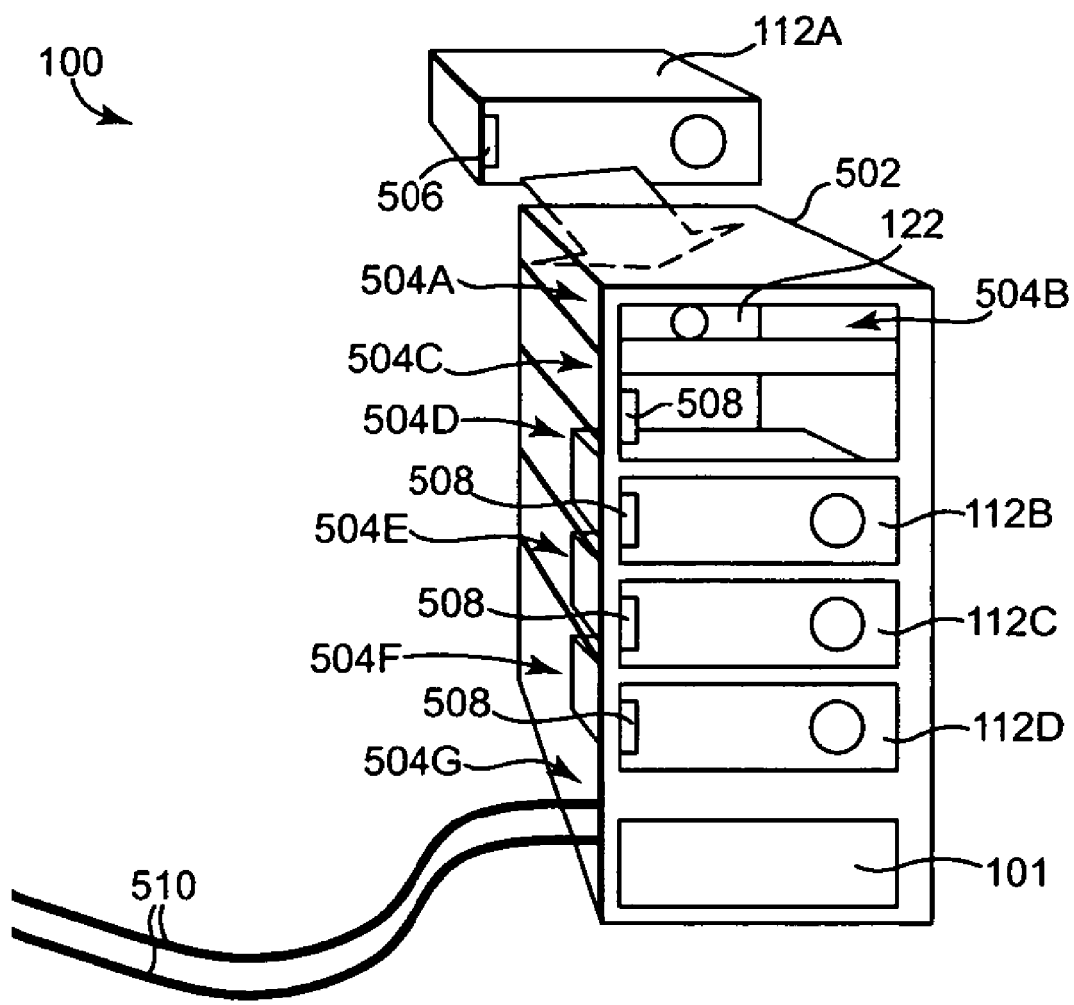
FIG. 5 is a diagram illustrating an implementation of the image display system shown in block form in FIG. 1 according to one embodiment of the present invention.

FIG. 5 is a diagram illustrating an implementation of the image display system 100 shown in block form in FIG. 1 according to one embodiment of the present invention. Image display system 100 includes housing or rack 502, projectors 112A-112D, camera 122, and controller 101. Housing 502 includes a plurality of bays 504A-504G (collectively referred to as bays 504) for receiving removable modules. In appearance, according to one embodiment, system 100 resembles a server rack, with a number of available bays 504 for any desired number of projector modules 112 and camera modules 122.

As shown in FIG. 5, projectors 112A-112D are implemented as removable projector modules that are configured to be inserted into and removed from projector bays 504C-504F. Projector modules 112B-112D are shown inserted into the projector bays 504D-504F, and projector module 112A is shown removed from projector bay 504C. Camera 122 is implemented as a removable camera module that is configured to be inserted into and removed from camera bay 504A or 504B. Controller 101 is implemented as a removable controller module that is configured to be inserted into and removed from controller bay 504G. In other embodiments, a greater or lesser number of bays 504, camera modules 122, and projector modules 112 may be used.

In the illustrated embodiment, each projector bay 504C-504F includes an electrical connector 508, and each projector module 112 includes an electrical connector 506 that is configured to mate with the electrical connector 508 when the projector module 112 is inserted into one of the bays 504C-504F. In one form of the invention, camera module 122 also includes an electrical connector 506 that is configured to mate with an electrical connector 508 in bay 504A or 504B. Electrical connectors 508 are coupled to controller module 101 to allow projector modules 112 to communicate with and receive sub-frames from controller module 101, and to allow camera module 122 to communicate with controller module 101. Electrical connectors 506 and 508 form part of the communication links 109 shown in FIG. 1 between controller 101, and projector modules 112 and camera 122. Cables 510 are coupled to controller module 101 to provide power and video connections for controller module 101.

In one embodiment, the connections between the controller module 101 and the projector modules 112 are conventional connections for providing image information, communications, and power to projector modules 112, and are independent of both the number and type of projector modules 112 attached. This simplicity in the connection is important to facilitate the insertion and removal of projector modules 112, and dynamic updating of the system 100. In one form of the invention, projector modules 112 and camera modules 122 are configured to be hot-swappable in a manner similar to a hot-swappable hard drive in a server. Thus, modules 112 and 122 may be removed and replaced without shutting down the power of system 100.

Adding, replacing, or upgrading any one (or more) of the projector modules 112 is automatically detected and compensated for by the controller module 101. Controller module 101 is configured to obtain status information and projector specification data from projector modules 112, send commands to projector modules 112, and detect the insertion, removal, and failure of projector modules 112. When controller module 101 detects the insertion, removal, or failure of a projector module 112, controller module 101 automatically recalibrates and rebalances the system 100, and the operation of the system 100 continues uninterrupted. In one form of the invention, when controller module 101 detects the addition of a projector module 112 to the system 100, controller module 101 automatically determines the geometric mapping ($F_{ik}$) between the added projector module 112 and the reference projector 118 based on image information captured by camera module 122. Geometric mappings ($F_{ik}$), and the determination of these mappings, are described above, including Equation XIV and the corresponding description of this Equation.

In one embodiment, controller module 101 and projector modules 112 are configured to exchange metadata using XML-based message passing or other appropriate protocol. In this manner, controller module 101 automatically determines the number and specifications of the available projector modules 112 (e.g., resolution, color spectrum, frame rate, lumens, color wheel percentages, gamuts, etc.) and produces optimal sub-frames based on the information received from the projector modules 112. In one form of the invention, controller module 101 also automatically determines the number and specifications of the camera modules 122 via the exchange of metadata. In one embodiment, controller module 101 receives specification data from the various resources in system 100, including projector modules 112 and camera modules 122, and optimizes the system 100 based on the available system resources detected by the controller module 101 and on the received specification data. The metadata transmitted from the projector modules 112 to the controller module 101 is utilized by the controller module 101 in configuring the system 100 at run time. For example, if a tiled projection configuration is requested, then the controller module 101 would know based on the metadata that a luminance correction should be performed to help optimize the system 100.

In one form of the invention, system 100 is configured to be scaled upwards by combining multiple racks 502 of projector modules 112, and communicatively coupling the racks together. In one embodiment, each of the racks 502 in the system includes a controller module 101. In another embodiment, a single controller module 101 is shared by multiple racks 502. The use of a rack 502 with removable modules 112A-112D, 122, and 101, according to one form of the invention provides several advantages over systems that use separate standalone projectors. In one embodiment, rack 502 helps to maintain the projector modules 112A-112D in a fixed relationship, and physically isolate the projector modules 112A-112D from vibrations (e.g., vibrations caused by people walking near the projector modules, caused by other projectors, or caused by other vibration sources). In one embodiment, rack 502 also provides thermal isolation for the projector modules 112A-112D, reduces the time and complexity that might otherwise be involved in reconfiguring the system, and pre-aligns the projector modules 112A-112D so that after being inserted into the rack 502, the projector modules 112A-112D are all generally pointing in the correct direction.

One of the advantages of a multi-projector system over a single-projector system is fault-tolerance. If a single full-color projector fails, and other full-color projectors remain operational, the overall image reduces in intensity, but the color balance and image uniformity are unaffected. However, if each projector 112 is dedicated to a unique single color, but is not dynamically reconfigurable like in one embodiment of the present invention, and one projector 112 fails, the color balance may be destroyed, and the resulting image may become unwatchable. The use of full-color projectors 112 preserves the fault-tolerance of the system 100 as a whole, but the display of full-color in a projector 112 has several distinct disadvantages (e.g., vibration, reduced output, increased processing requirements, catastrophic failure modes, etc.).

One form of the present invention provides fault-tolerance in a system of color-dedicated projectors 112, by using an architecture through which projectors 112 are dynamically reconfigurable. In one embodiment, one or more of the projectors 112 are dedicated to a single color (single color mode), but are also configured to be automatically changed to a different color, or automatically switched to a multiple color mode for projecting multiple color images (e.g., red, green, and blue), and thereby compensate for a failed projector 112 and continue normal operation of the system. For any number, n, of projectors 112, system 100 is configured such that when one projector 112 fails, the system 100 automatically reconfigures itself to an optimal n−1 state and all that is lost is partial brightness. In one form of the invention, the system 100 is configured to be reduced incrementally on a projector-by-projector basis until only a single projector 112 remains, and the system 100 automatically reconfigures itself to produce optimal sub-frames based on the remaining projectors 112.

In one embodiment, projectors 112 are dynamically reconfigurable projectors, and the filter 406 (FIG. 4) of each projector 112 is a color wheel that is configured to be locked in place in the single color mode, and rotate in a conventional manner in the multiple color mode. In another embodiment, each projector 112 includes two color wheels, with one color wheel configured to rotate in the usual manner, and another color wheel configured to be locked in a desired position, and each projector 112 is configured to switch between the two color wheels depending upon the current mode of operation.

The dynamically reconfigurable projectors 112 according to one form of the invention enable a system 100 such that for any projector system of n>1 projectors, an optimal configuration of each projector 112 can be objectively determined, but if any one of the projectors 112 should fail, the system 100 can automatically switch to the optimal configuration for the n−1 remaining projectors 112. The fault tolerant system 100 with dynamically reconfigurable projectors 112 according to one embodiment is described in further detail below with reference to FIG. 6.

Figure 6:
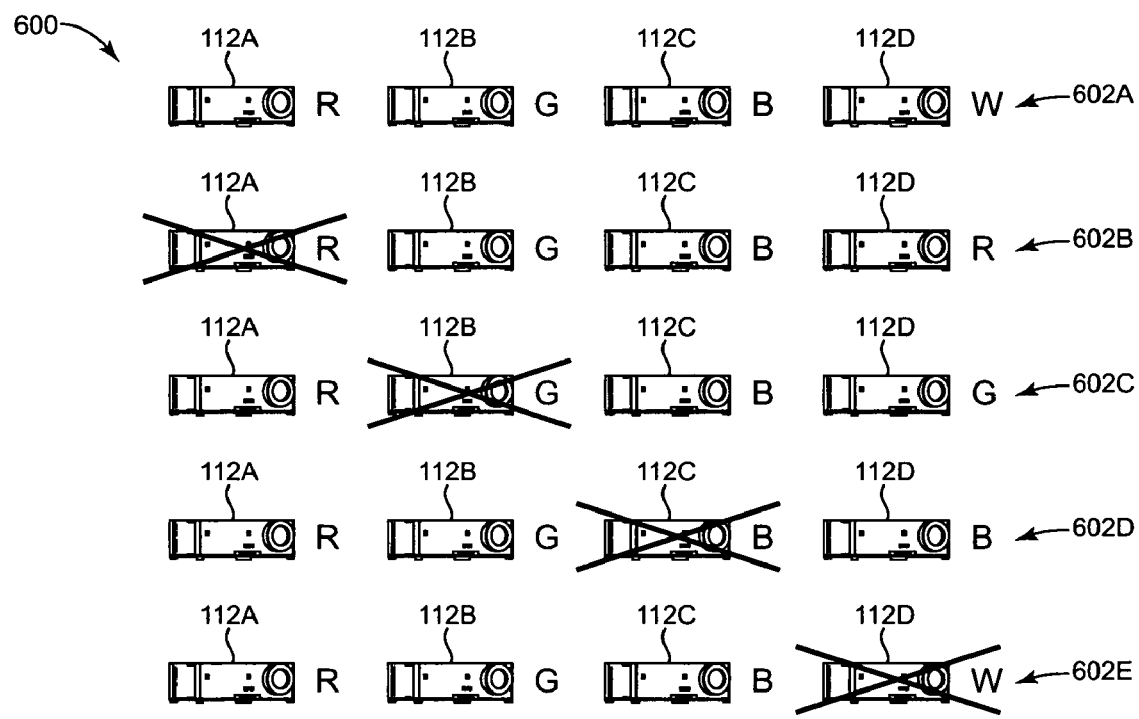
FIG. 6 is a diagram illustrating a fault tolerance method according to one embodiment of the present invention.

FIG. 6 is a diagram illustrating a fault tolerance method 600 according to one embodiment of the present invention. Five projector configurations 602A-602E for system 100 are shown in FIG. 6. There are four projectors 112A-112D in each configuration 602A-602E. In one embodiment, each of the projectors 112A-112D is configured to be dynamically switched by controller 101 between the single color mode and the multiple color mode. In another embodiment, projectors 112A-112C are configured to be operated only in the single color mode, and projector 112D is configured to be dynamically switched by controller 101 between the single color mode and the multiple color mode.

The first configuration 602A represents a normal configuration with each of the projectors 112A-112D operating properly. For configuration 602A, projector 112A is operating in the single color mode and is projecting red (R) light, projector 112B is operating in the single color mode and is projecting green (G) light, projector 112C is operating in the single color mode and is projecting blue (B) light, and projector 112D is operating in the multiple color mode and is projecting multiple colors of light (e.g., white (W) light, or red, green, and blue light). For a 4-projector system, configuration 602A allows the maximum number of projectors 112 to be dedicated to a single color, while still retaining equal proportions of each primary color.

The second configuration 602B represents a modified configuration that is automatically implemented by controller 101 upon sensing that projector 112A has failed (represented by an X through projector 112A in FIG. 6). In the illustrated embodiment of configuration 602B, projectors 112B and 112C continue to operate in the single color mode and project green and blue light, respectively, but controller 101 causes projector 112D to switch to the single color mode and project red light. In this manner, projector 112D compensates for the loss of the red light from projector 112A, and the overall system 100 is able to continue to deliver full color images. The system 100 automatically reconfigures itself to the optimal configuration for the three remaining projectors 112B, 112C, and 112D. The reconfigured system 100 in the second configuration 602B still has the maximum number of color-dedicated projectors 112, and the total brightness is still balanced across all color channels.

The third configuration 602C represents a modified configuration that is automatically implemented by controller 101 upon sensing that projector 112B has failed (represented by an X through projector 112B in FIG. 6). In the illustrated embodiment of configuration 602C, projectors 112A and 112C continue to operate in the single color mode and project red and blue light, respectively, but controller 101 causes projector 112D to switch to the single color mode and project green light. In this manner, projector 112D compensates for the loss of the green light from projector 112B, and the overall system 100 is able to continue to deliver full color images. The system 100 automatically reconfigures itself to the optimal configuration for the three remaining projectors 112A, 112C, and 112D. The reconfigured system 100 in the third configuration 602C still has the maximum number of color-dedicated projectors 112, and the total brightness is still balanced across all color channels.

The fourth configuration 602D represents a modified configuration that is automatically implemented by controller 101 upon sensing that projector 112C has failed (represented by an X through projector 112C in FIG. 6). In the illustrated embodiment of configuration 602D, projectors 112A and 112B continue to operate in the single color mode and project red and green light, respectively, but controller 101 causes projector 112D to switch to the single color mode and project blue light. In this manner, projector 112D compensates for the loss of the blue light from projector 112C, and the overall system 100 is able to continue to deliver full color images. The system 100 automatically reconfigures itself to the optimal configuration for the three remaining projectors 112A, 112B, and 112D. The reconfigured system 100 in the fourth configuration 602D still has the maximum number of color-dedicated projectors 112, and the total brightness is still balanced across all color channels.

The fifth configuration 602E represents a modified configuration that is automatically implemented by controller 101 upon sensing that projector 112D has failed (represented by an X through projector 112D in FIG. 6). In the illustrated embodiment of configuration 602E, projectors 112A, 112B, and 112C continue to operate in the single color mode and project red, green, and blue light, respectively. Thus, despite the loss of projector 112D, the overall system 100 is able to continue to deliver full color images. The system 100 in the fifth configuration 602E is in the optimal configuration for the three remaining projectors 112A-112C, with the maximum number of color-dedicated projectors 112, and with the total brightness still being balanced across all color channels.

Thus, as shown in FIG. 6 and described above, if any of the color-dedicated projectors 112A-112C fails, the full-color projector 112D assumes that color and restores balance. If the full-color projector 112D fails, the other projectors 112A-112C remain in their current states, and the system 100 remains stable.

To determine an optimal configuration for any number of projectors 112, consider a series of three projectors 112. In this case, the optimal configuration according to one form of the invention is for each projector 112 to be dedicated to projecting only one primary color. If any one of the three projectors 112 fails in this case, and there are two projectors 112 left, in one form of the invention, controller 101 is configured to cause the remaining two projectors 112 to both switch to the multiple color mode and project full-color images. If one of the remaining two projectors 112 fails, then the last remaining projector 112 remains in the multiple color mode and projects full-color images.

The configuration of the projectors 112 will depend upon the number of projectors 112 in the system 100. The starting projector configurations for various numbers of projectors 112 according to one form of the invention is as follows:

1 projector: White (i.e., full-color)
2 projectors: White, White
3 projectors: Red, Green, Blue
4 projectors: Red, Green, Blue, White
5 projectors: Red, Green, Blue, White, White
6 projectors: Red, Green, Blue, Red, Green, Blue The above pattern can be extended to any desired number of projectors 112. To extend this to any arbitrary number of projectors 112, the number of red, green, and blue projector triplets (in which each projector 112 is dedicated to a single color) is maximized, and any remaining projectors 112 operate in the multiple color mode. Thus, for any number, n, of projectors 112, an optimal starting state is achieved in system 100, and system 100 retains the ability to minimize the impact of failed projectors 112 and reconfigure itself to an optimal state based on the remaining projectors 112.

Depending upon the output characteristics of the light sources 408, as well as other factors, using equal numbers of projectors 112 for each color (e.g., red, green, and blue) as described above may not be optimal. For example, one or more of the light sources 408 may be deficient in the red portion of the spectrum compared to the green and blue portions of the spectrum, and an optimum configuration might be 50 percent red projectors 112, 30 percent blue projectors 112, and 20 percent green projectors 112. In one form of the invention, controller module 101 is configured to take into account characteristics of the projector modules 112, such as the spectral distributions of the light sources 408, in automatically determining an optimum configuration for the system 100, including configurations of system 100 that include unequal numbers of projectors for each color.

In one form of the invention, controller module 101 is configured to optimize system 100 with respect to one or more of a variety of different parameters, including brightness and color gamut, as well as other parameters. Thus, based on the available number of projectors 112, the specifications of these projectors 112, and the parameter(s) over which to optimize, controller module 101 determines the best configuration for system 100, and automatically implements this configuration. For example, assuming system 100 includes eight projectors 112 (projectors 1-8), and controller module 101 is configured to optimize system 100 for a particular color gamut such that there is a 2:1:1 ratio of red, green, and blue projectors 112, respectively. In this example, controller module 101 would initially configure projectors 1-4 to project red, projectors 5-6 to project green, and projectors 7-8 to project blue. If controller module 101 detects that projector 1 fails or is removed, controller module 101 automatically optimizes the system 100 to best match the 2:1:1 ratio, and keeps projectors 2-4 as red, projector 5 as green, projector 7 as blue, but switches projectors 6 and 8 to white (e.g., ⅓ red, ⅓ green, and ⅓ blue). This achieves a ratio of 3 and ⅓ red, 1 and ⅔ green, and 1 and ⅔ blue. The configuration/optimization parameter(s) used by system 100 may be predetermined or user-defined.

Using a solid state color wheel (which, for example, uses electrical current and switching LCD cells to change color) in each projector 112 provides additional flexibility in the fault tolerant system 100. By using a solid state color wheel, each projector 112 is no longer limited to running in single or triple color mode, but can also be set to run in grayscale, can automatically balance color segments as lamps age and mismatched projectors 112 are paired together, or even display complementary colors.

One form of the present invention provides an image display system 100 with multiple overlapped low-resolution projectors 112 coupled with an efficient real-time (e.g., video rates) image processing algorithm for generating sub-frames 110. In one embodiment, multiple low-resolution, low-cost projectors 112 are used to produce high resolution images 114 at high lumen levels, but at lower cost than existing high-resolution projection systems, such as a single, high-resolution, high-output projector. One form of the present invention provides a scalable image display system 100 that can provide virtually any desired resolution, brightness, and color, by adding any desired number of component projectors 112 to the system 100.

In some existing display systems, multiple low-resolution images are displayed with temporal and sub-pixel spatial offsets to enhance resolution. There are some important differences between these existing systems and embodiments of the present invention. For example, in one embodiment of the present invention, there is no need for circuitry to offset the projected sub-frames 110 temporally. In one form of the invention, the sub-frames 110 from the component projectors 112 are projected "in-sync" (i.e., sub-frames 110 are simultaneously projected from multiple projectors 112 at the same time with no temporal offset between the projected sub-frames 110). As another example, unlike some existing systems where all of the sub-frames go through the same optics and the shifts between sub-frames are all simple translational shifts, in one form of the present invention, the sub-frames 110 are projected through the different optics of the multiple individual projectors 112. In one form of the invention, the signal processing model that is used to generate optimal sub-frames 110 takes into account relative geometric distortion among the component sub-frames 110, and is robust to minor calibration errors and noise.

It can be difficult to accurately align projectors into a desired configuration. In one embodiment of the invention, regardless of what the particular projector configuration is, even if it is not an optimal alignment, sub-frame generator 108 determines and generates optimal sub-frames 110 for that particular configuration.

Algorithms that seek to enhance resolution by offsetting multiple projection elements have been previously proposed. These methods assume simple shift offsets between projectors, use frequency domain analyses, and rely on heuristic methods to compute component sub-frames. In contrast, one form of the present invention utilizes an optimal real-time sub-frame generation algorithm that explicitly accounts for arbitrary relative geometric distortion (not limited to homographies) between the component projectors 112, including distortions that occur due to a target surface 116 that is non-planar or has surface non-uniformities. One form of the present invention generates sub-frames 110 based on a geometric relationship between a hypothetical high-resolution reference projector 118 at any arbitrary location and each of the actual low-resolution projectors 112, which may also be positioned at any arbitrary location.

One form of the present invention provides a system 100 with multiple overlapped low-resolution projectors 112, with each projector 112 projecting a different colorant to compose a full color high-resolution image 114 on the screen 116 with minimal color artifacts due to the overlapped projection. By imposing a color-prior model via a Bayesian approach as is done in one embodiment of the invention, the generated solution for determining sub-frame values minimizes color aliasing artifacts and is robust to small modeling errors.

Using multiple off the shelf projectors 112 in system 100 allows for high resolution. However, if the projectors 112 include a color wheel, which is common in existing projectors, the system 100 may suffer from light loss, sequential color artifacts, poor color fidelity, reduced bit-depth, and a significant tradeoff in bit depth to add new colors. One form of the present invention eliminates the need for a color wheel, and uses in its place, a different color filter for each projector 112. Thus, in one embodiment, projectors 112 each project different single-color images. By not using a color wheel, segment loss at the color wheel is eliminated, which could be up to a 20% loss in efficiency in single chip projectors. One embodiment of the invention increases perceived resolution, eliminates sequential color artifacts, improves color fidelity since no spatial or temporal dither is required, provides a high bit-depth per color, and allows for high-fidelity color.

Image display system 100 is also very efficient from a processing perspective since, in one embodiment, each projector 112 only processes one color plane. Thus, each projector 112 reads and renders only one-third (for RGB) of the full color data.

In one embodiment, image display system 100 is configured to project images 114 that have a three-dimensional (3D) appearance. In 3D image display systems, two images, each with a different polarization, are simultaneously projected by two different projectors. One image corresponds to the left eye, and the other image corresponds to the right eye. Conventional 3D image display systems typically suffer from a lack of brightness. In contrast, with one embodiment of the present invention, a first plurality of the projectors 112 may be used to produce any desired brightness for the first image (e.g., left eye image), and a second plurality of the projectors 112 may be used to produce any desired brightness for the second image (e.g., right eye image). In another embodiment, image display system 100 may be combined or used with other display systems or display techniques, such as tiled displays.

One form of the present invention provides a solution to problems identified above in the Background section by proposing a fundamentally new way to think about digital cinema projection. One embodiment of the invention uses a combination of multiple affordable projectors 112 that may be individually upgraded for new projection elements 112 at a much lower incremental marginal cost than purchasing an entire new system. This means that not only is a theater not restricted to a particular vendor, but also the technology used for individual projection elements 112 may be different and may be mixed and matched. The affordable projection elements 112 serve as a "pay as you go" option for theaters that also allows them to keep improving quality and customer experience as technology improves. A projection system can be upgraded at will, a single projector module 112 at a time (whether the new modules 112 are the same or improved over the modules 112 already installed). This spreads the cost of an upgrade over a longer period of time. In the event that any element needs to be replaced, better salvage values may be obtained by exploiting large established markets such as consumer auctions (e.g., eBay). In contrast, a single high cost theater projector that has become obsolete has a very limited market and probably very low salvage value as a result. In one form of the invention, controller module 101 includes an interface layer that abstracts commands to facilitate communication with projectors 112 from different vendors, which may have entirely different modes of operation. The interface layer is important for interoperability with legacy systems and mixing and matching projectors 112 from different vendors.

In one embodiment, if a projector module 112 fails or is rendered inoperable, it may be trivially removed and/or replaced with very little training or experience. One form of the present invention also allows a theater to quickly redistribute resources among various projection systems. For example, if one screen at the theater is not being used, the projector modules 112 may be quickly removed and installed in another system in use for a second screen, thereby increasing the brightness and resolution of the images displayed on the second screen. Thus, system 100 according to one form of the invention provides dynamic resource allocation and reconfigurability, and is a more cost effective solution than previous systems.

One form of the present invention provides the joint benefits of a multi-projector system 100 in which each projector 112 is dedicated to a single color, and a fault-tolerant system in which the failure of any single projector 112 has minimal impact on the overall image quality. One embodiment of the invention provides a color-dedicated projector system in which the failure of any single color-dedicated projector 112 does not necessitate the removal of at least two other projectors 112. One form of the invention provides a fault-tolerant system 100 in which as many projectors 112 as possible can be dedicated to a single color, and thereby retain the benefits that color-dedication can provide.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A display system comprising:
a housing including a plurality of bays;
a plurality of removable projector modules configured to project images onto a surface, each projector module configured to be inserted into and removed from one of the bays; and
a controller coupled to the bays for sensing when projector modules are inserted into or removed from the bays.

2. The display system of claim 1, wherein the controller is implemented as a removable module that is configured to be inserted into and removed from one of the bays.

3. The display system of claim 1, wherein the projector modules are hot-swappable.

4. The display system of claim 1, wherein the controller is configured to receive image data for a first image and generate at least one sub-frame for each of the projector modules based on the image data.

5. The display system of claim 4, wherein the projector modules are configured to project the generated sub-frames onto a target surface.

6. The display system of claim 5, wherein the projected sub-frames at least partially overlap on the target surface.

7. The display system of 1, and further comprising:
at least one removable camera module configured to be inserted into and removed from one of the bays.

8. The display system of claim 1, wherein the controller is configured to automatically determine a geometric mapping between a projector module inserted into one of the bays and a reference projector upon sensing the insertion of the projector module into one of the bays.

9. The display system of claim 8, wherein the geometric mapping is determined based on images captured by a camera module inserted into one of the bays.

10. The display system of claim 1, wherein the controller is configured to sense failure of projector modules inserted into the projector bays.

11. The display system of claim 10, wherein at least one of the projector modules includes a single color mode for projecting a single color at a time and a multiple color mode for projecting multiple colors at a time.

12. The display system of claim 11, wherein the controller is configured to cause at least one of the projector modules to switch modes in response to sensing a failure of a projector module.

13. The display system of claim 11, wherein at least one of the projector modules includes a color wheel that includes a plurality of different color filters, and wherein the color wheel is configured to rotate in the multiple color mode, and is configured to be held in one position in the single color mode.

14. The display system of claim 1, wherein the plurality of projector modules includes at least three projector modules that are each dedicated to projecting a single unique color.

15. A method of displaying an image with a display system, the method comprising:
receiving image data for the image;
generating a first sub-frame and a second sub-frame corresponding to the image data;
projecting the first sub-frame with a first projector onto a target surface;
projecting the second sub-frame with a second projector onto the target surface, wherein the first and the second sub-frames at least partially overlap on the target surface;
automatically detecting a change in available resources of the display system; and
automatically modifying operation of the first projector in response to detection of removal or failure of the second projector, thereby continuing normal operation of the display system.

16. The method of claim 15, and further comprising:
transmitting projector specification data from the first and second projectors.

17. The method of claim 16, and further comprising:
automatically optimizing the display system based on the transmitted specification data and on detected available resources.

18. The method of claim 15, wherein detecting a change in available resources includes detecting at least one of an addition, removal, or failure, of a projector in the display system.

19. The method of claim 18, wherein the first and second projectors are implemented as modules that are configured to be inserted into and removed from a housing having a plurality of bays.

20. The method of claim 19, wherein the display system includes a controller module for generating the first and second sub-frames, and wherein the controller module is configured to be inserted into and removed from one of the bays.

21. The method of claim 19, wherein the display system includes a removable camera module configured to be inserted into and removed from one of the bays.

22. The method of claim 18, and further comprising:
automatically determining a geometric mapping between a projector and a reference projector upon detecting the addition of a projector to the display system.

23. The method of claim 18, wherein at least one of the first and the second projectors includes a single color mode for projecting a single color at a time and a multiple color mode for projecting multiple colors at a time.

24. The method of claim 23, and further comprising:
switching modes of at least one of the first and the second projectors in response to detecting a failure of a projector in the display system.

25. The method of claim 18, wherein the first and the second projectors are each configured to project a single unique color.

26. A display system for displaying an image, the system comprising:
a buffer adapted to receive image data for the image;
a controller configured to define a plurality of sub-frames corresponding to the image data;
a plurality of projection devices adapted to project the plurality of sub-frames onto a target surface in an overlapping manner; and
wherein the controller is configured to automatically sense a change in available resources of the display system, and automatically modify operation of a first one of the projection devices in response to detection of removal or failure of a second one of the projection devices, thereby compensating for the removal or failure of the second projection device.

27. A control system for generating low-resolution sub-frames for simultaneous projection by a system of projectors onto a viewing surface at spatially offset positions to generate the appearance of a high-resolution image, the control system comprising:
means for receiving a first high-resolution image;
means for generating a plurality of low-resolution sub-frames based on the first high-resolution image;
means for automatically detecting a failure of a projector in the system of projectors; and
means for causing at least one of the projectors to switch between a single color mode for projecting a single color at a time and a multiple color mode for projecting multiple colors at a time when a failure of a projector is detected.

28. A computer-readable medium having computer-executable instructions for performing a method of generating low-resolution sub-frames for simultaneous projection by a projector system onto a viewing surface at spatially offset positions to generate the appearance of a high-resolution image, comprising:
receiving image data for the image;
generating a plurality of sub-frames corresponding to the image data;
sensing a change in status of the projector system, including whether a projector has been added to or removed from the projector system; and
automatically causing a change in operation of a first projector in the projector system upon sensing removal of a second projector from the projector system, thereby compensating for the removal of the second projector.

29. The computer-readable medium of claim 28, wherein sensing a change in status of the projector system includes sensing whether a projector in the projector system has failed, and wherein the method further comprises:
automatically causing a change in operation of the first projector upon sensing a failure of the second projector, thereby compensating for the failure of the second projector.

* * * * *

UNITED STATES PATENT AND TRADEMARK OFFICE
CERTIFICATE OF CORRECTION

PATENT NO. : 7,387,392 B2
APPLICATION NO. : 11/220092
DATED : June 17, 2008
INVENTOR(S) : Simon Widdowson et al.

Page 1 of 1

It is certified that error appears in the above-identified patent and that said Letters Patent is hereby corrected as shown below:

In column 11, in Equation XI, lines 25-27, delete " $T_{C_2 i} \sum_{j=1}^{N} T_{C_2 ij} \hat{X}_j^{(n)}$ " and insert -- $T_{C_1 i} \sum_{j=1}^{N} T_{C_1 ij} \hat{X}_j^{(n)}$ --, therefor.

In column 22, line 50, in Claim 7, after "system of" insert -- claim --.

Signed and Sealed this

Seventh Day of July, 2009

JOHN DOLL
*Acting Director of the United States Patent and Trademark Office*